United States Patent
Zhang et al.

(10) Patent No.: US 9,570,727 B2
(45) Date of Patent: Feb. 14, 2017

(54) BATTERY SEPARATOR WITH Z-DIRECTION STABILITY

(75) Inventors: Zhengming Zhang, Charlotte, NC (US); Khuy V. Nguyen, Charlotte, NC (US); Pankaj Arora, Chesterfield, VA (US); Ronald W. Call, Rock Hill, SC (US); Donald K. Simmons, Fayetteville, GA (US); Tien Dao, Bensalem, PA (US)

(73) Assignee: Celgard LLC, Charlotte, NC (US)

( * ) Notice: Subject to any disclaimer, the term of this patent is extended or adjusted under 35 U.S.C. 154(b) by 1150 days.

(21) Appl. No.: 11/575,506

(22) PCT Filed: Oct. 18, 2005

(86) PCT No.: PCT/US2005/037135
§ 371 (c)(1),
(2), (4) Date: Feb. 11, 2008

(87) PCT Pub. No.: WO2006/047114
PCT Pub. Date: May 4, 2006

(65) Prior Publication Data
US 2008/0268345 A1    Oct. 30, 2008

Related U.S. Application Data

(63) Continuation-in-part of application No. 10/971,310, filed on Oct. 22, 2004, now abandoned.

(51) Int. Cl.
*H01M 2/16* (2006.01)
*C08J 5/22* (2006.01)
(Continued)

(52) U.S. Cl.
CPC ............. *H01M 2/166* (2013.01); *C08J 5/2206* (2013.01); *H01M 2/18* (2013.01); *H01M 10/052* (2013.01); *Y02E 60/122* (2013.01)

(58) Field of Classification Search
USPC .................................................. 429/129, 247
(Continued)

(56) References Cited

U.S. PATENT DOCUMENTS 4,650,730 A    3/1987  Lundquist et al.
5,281,491 A    1/1994  Rein et al.
(Continued)

FOREIGN PATENT DOCUMENTS

WO    WO 01/91219 A1    11/2001

OTHER PUBLICATIONS

Pankaj Arora, Zhengming Zhang, "Battery Separators," Chemical Reviews, 2004 Ed., American Chemical Society, (vol. 104), (Issue. 10), (pp. 4419-4462), (Oct. 13, 2004).

*Primary Examiner* — Patrick Ryan
*Assistant Examiner* — Julian Anthony
(74) *Attorney, Agent, or Firm* — Hammer & Associate, P.C.

(57) ABSTRACT

A battery separator is a microporous membrane. The membrane has a major volume of a thermoplastic polymer and a minor volume of an inert particulate filler. The filler is dispersed throughout the polymer. The membrane exhibits a maximum Z-direction compression of 95% of the original membrane thickness. Alternatively, the battery separator is a microporous membrane having a TMA compression curve with a first substantially horizontal slope between ambient temperature and 125° C., a second substantially horizontal slope at greater than 225° C. The curve of the first slope has a lower % compression than the curve of the second slope. The curve of the second slope is not less than 5% compression. The TMA compression curve is graphed so that the Y-axis represents % compression from original thickness and the X-axis represents temperature.

7 Claims, 4 Drawing Sheets

(51) Int. Cl.
*H01M 2/18* (2006.01)
*H01M 10/052* (2010.01)
(58) Field of Classification Search
IPC .................... H01M 2/1653,2/16, 2/162, 2/1613
See application file for complete search history.

(56) References Cited

U.S. PATENT DOCUMENTS

| | | |
|---|---|---|
| 6,413,676 B1 * | 7/2002 | Munshi .................. 429/306 |
| 6,432,586 B1 | 8/2002 | Zhang |
| 2001/0018150 A1 * | 8/2001 | Morita et al. .............. 429/231.8 |
| 2002/0006548 A1 * | 1/2002 | Tsutsue et al. .............. 429/217 |
| 2004/0086782 A1 | 5/2004 | Zhang et al. |

\* cited by examiner

US 9,570,727 B2

BATTERY SEPARATOR WITH Z-DIRECTION STABILITY

RELATED APPLICATION

This application is a continuation-in-part of U.S. patent application Ser. No. 10/971,310 filed Oct. 22, 2004 now abandoned.

FIELD OF THE INVENTION

The present invention is directed to preventing "sudden" thermal runaway in batteries, e.g., lithium batteries.

BACKGROUND OF THE INVENTION

In batteries, for example, lithium ion batteries, thermal runaway is a potential problem. Thermal runaway may be initiated by, among other things, physical contact between the anode and cathode of the battery, due to the internal force created by the volume changes of the anode and the cathode during normal cycling, which, in turn, causes a rapid evolution of heat. The rapid evolution of heat may cause ignition of thermal chemical reactions of anode/electrolyte, cathode/electrolyte, anode/cathode, or electrolyte/electrolyte. The ignition scenario may lead to a hazardous situation for the battery.

Thermal runaway may be categorized as 'sudden' thermal runaway or 'delayed' thermal runaway. Sudden thermal runaway refers to very rapid heat evolution, i.e., arising in less than 1 second after inception. Delayed thermal runaway refers to heat evolution, i.e., arising in more than 3 seconds after inception. In lithium ion batteries, over 99% of failures are caused by sudden thermal runaway. Delayed thermal runaway may be safeguarded against by the use of a 'shut-down' separator (e.g., a separator that responds to increasing heat by pore closure that stops ionic flow between the anode and cathode), or by the rapid dissipation of heat from the cell. Sudden thermal runaway, however, has not been successfully dealt with.

Sudden thermal runaway of the Li-ion cells may be simulated in battery safety tests referred to as: the 'nail penetration' test or the 'crush' test (crush tests include: ball crush, bar crush, and plate crush). In each of these tests, an external force, applied via a nail, ball, bar, or plate, is exerted on the housing (or 'can') of the battery which, in turn, may cause the anode and cathode to come into physical contact.

The foregoing safety tests exacerbate the tight fitting situation already existing within the battery housing. For example, lithium ion batteries are, most often, produced in cylindrical and prismatic forms. The anode/separator/cathode are wound or folded, without electrolyte, into shape and then snuggly fit into their housing (can) and capped shut. When electrolyte is added, the anode/separator/cathode swell. This causes internal forces within the can to increase. Later, during 'formation' (i.e., when the battery is given an initial charge), the anode and cathode expand again (e.g., the anode may expand by about 10% and the cathode may expand by about 3%). The expansion during formation again causes internal forces within the can to increase. These internal forces, such as those from the nail penetration and crush tests mentioned above, are directed toward the center of the battery. When the external forces are exerted on the can, those forces are also directed toward the center of the battery. The result is extraordinary pressures within the battery and those pressures are forcing the anode and cathode into physical contact by compressing the microporous membrane separator placed therebetween.

The use of microporous membranes as battery separators is known. For example, microporous membranes are used as battery separators in lithium ion batteries. Such separators may be single layered or multi-layered thin films made of polyolefins. These separators often have a 'shut-down' property such that when the temperature of the battery reaches a predetermined temperature, the pores of the membrane close and thereby prevent the flow of ions between the electrodes of the battery. Increasing temperature in the battery may be caused by internal shorting, i.e., physical contact of the anode and cathode. The physical contact may be caused by, for example, physical damage to the battery, damage to the separator during battery manufacture, dendrite growth, excessive charging, and the like. As such, the separator, a thin (e.g., typically about 8-25 microns thickness) microporous membrane, must have good dimensional stability.

Dimensional stability, as it applies to battery separators, refers to the ability of the separator not to shrink or not to excessively shrink as a result of exposure to elevated temperatures. This shrinkage is observed in the X and Y axes of the planar film. This term has not, to date, referred to the Z-direction dimensional stability.

Puncture strength, as it applies to battery separators, is the film's ability to resist puncture in the Z-direction. Puncture strength is measured by observing the force necessary to pierce a membrane with a moving needle of known physical dimensions.

To date, nothing has been done to improve the Z-direction dimensional stability of these battery separators. Z-direction refers to the thickness of the separator. A battery is tightly wound to maximize its energy density. Tightly winding means, for a cylindrically wound battery, that forces are directed radially inward, causing a compressive force on the separator across its thickness dimension. In the increasing temperature situation, as the material of the separator starts to flow and blind the pores, the electrodes of the battery may move toward one another. As they move closer to one another, the risk of physical contact increases. The contact of the electrodes must be avoided.

Accordingly, there is a need for a battery separator, particularly a battery separator for a lithium ion battery, having improved Z-direction stability, and for a battery separator that can prevent or reduce failure arising from sudden thermal runaway.

In the prior art, it is known to mix filler into a separator for a lithium battery. In U.S. Pat. No. 4,650,730, a multi-layered battery separator is disclosed. The first layer, the 'shut down' layer, is an unfilled microporous membrane. The second layer, the dimensionally stable layer, is a particulate filled microporous layer. The second layer, in final form (i.e., after extraction of the plasticizer), has a composition weight ratio of 7-35/50-93/0-15 for polymer/filler/plasticizer. There is no mention of Z-direction dimensional stability; instead, dimensional stability refers to the length and breadth dimensions of the separator. The filler is used as a processing aid so that the high molecular weight polymer can be efficiently extruded into a film. In U.S. Pat. No. 6,432,586, a multi-layered battery separator for a high-energy lithium battery is disclosed. The separator has a first microporous membrane and a second nonporous ceramic composite layer. The ceramic composite layer consists of a matrix material and inorganic particles. The matrix material may be selected from the group of polyethylene oxide (PEO), polyvinylidene fluoride (PVDF), polytetrafluoroethylene (PTFE) polyurethane, polyarcylonitrile (PAN), polymethylmethacrylate (PMMA), polytetraethylene glycol diacrylate, copolymers thereof and mixtures thereof. The inorganic particles may be selected from the group of silicon dioxide ($SiO_2$), aluminum oxide ($Al_2O_3$), calcium carbonate ($CaCO_3$), titanium dioxide ($TiO_2$), $SiS_2$, $SiPO_4$, and the like. The particulate makes up about 5-80% by weight of the ceramic composite layer, but most preferably 40-60%. There is no mention of Z-direction stability, and the particulate is chosen for its conductive properties.

SUMMARY OF THE INVENTION

A method for preventing or reducing sudden thermal runaway in a battery is disclosed. In this method, a thermoplastic microporous membrane having inert, thermally non-deforming particulate dispersed therein is placed between the electrodes of the battery. Thus, for example, when an external force is applied to the battery, physical contact of the electrodes is prevented by the particulate-filled separator.

DESCRIPTION OF THE DRAWINGS

For the purpose of illustrating the invention, there is shown in the drawing information about the preferred embodiment of the invention; it being understood, however, that this invention is not limited to the precise information shown.

DESCRIPTION OF THE INVENTION

Figure 1:
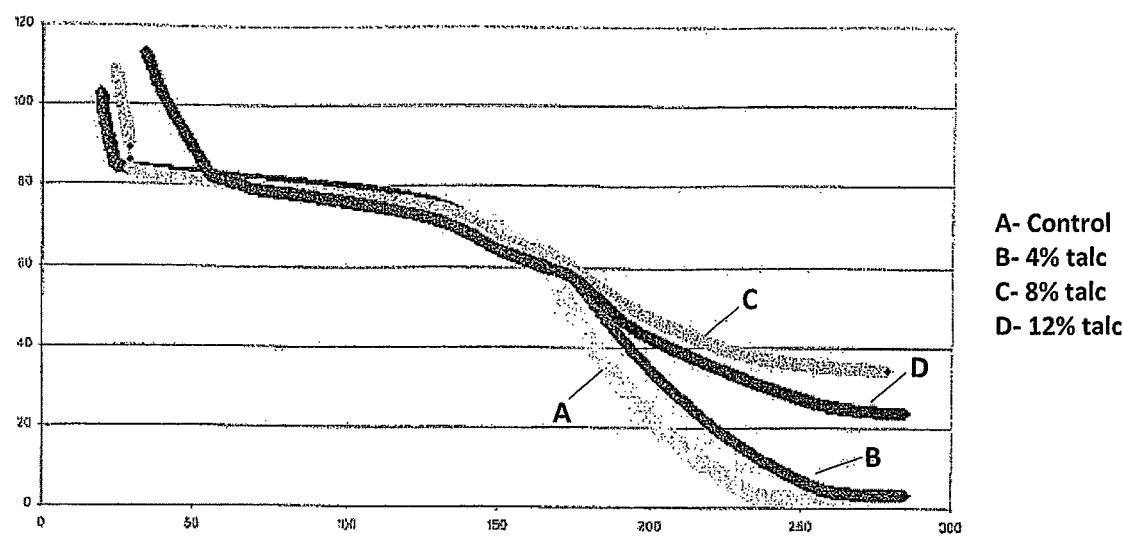
FIG. 1 is a graphical illustration of TMA compression curves for several differing membranes.

A battery, as used herein, refers to a charge storage device, e.g., a chemical generator of emf (electromotive force) or a capacitor. Typically, the battery is a device comprising, in general, an anode, a cathode, a separator, an electrolyte, and a housing (or can). The battery, which is believed to have the greatest potential to benefit from the present invention, is a rechargeable lithium battery, e.g., having a lithium metal (Li), lithium alloy ($LiSi_x$, $LiSn_x$, $LiAl_x$, etc.), or a lithiated carbon material ($Li_xC_6$, where $X \leq 1$), or an intercalation compound (or transition metal compound) as a negative electrode (anode). Such intercalation compounds may include, but are not limited to, $Li_xWO_2$, $Li_xMoO_2$, $Li_xTiS_2$, and $Li_xTi_yO_z$. These rechargeable lithium batteries are also known as lithium ion batteries or lithium polymer batteries. The cathodes, electrolytes, and housings for such batteries are well known and conventional. The separator, by which the improvement discussed herein is obtained, is discussed in greater detail hereinafter.

A battery separator, as used herein, refers to a thin, microporous membrane that is placed between the electrodes of a battery. Typically, it physically separates the electrodes to prevent their contact, allows ions to pass through the pores between the electrodes during discharging and charging, acts as a reservoir for the electrolyte, and may have a 'shut down' function.

Microporous membranes typically have porosities in the range of 20-80%, alternatively in the range of 28-60%. The average pores size is typically in the range of 0.02 to 2.0 microns, alternatively in the range of 0.04 to 0.25 microns. The membrane typically has a Gurley Number in the range of 5 to 150 sec. alternatively 20 to 80 sec (Gurley Numbers refers to the time it takes for 10 cc of air at 12.2 inches of water to pass through one square inch of membrane). The membrane may range in thickness from about 0.1 to 75 microns, alternatively 8 to 25 microns. Membranes may be single layered or multi-layered. In multi-layered membranes, at least one of the membranes will include the filler discussed in greater detail below. A multi-layered separator may have three layers where the filled layer is sandwiched between two other layers or two-filled layer may sandwich another membrane. Other layer, as used herein, refers to any layer, including coatings, other than the inventive layer. Other configurations are readily apparent to one of ordinary skill.

Thermoplastic polymer generally refers to any synthetic thermoplastic polymer that softens when heated and returns to its original condition when cooled. Such thermoplastic polymers include: polyolefins, polyvinyl halogens (e.g., PVC), nylons, fluorocarbons, polystyrenes, and the like. Of the thermoplastics, polyolefins are the most interesting. Polyolefins include, but are not limited to, polyethylene, ultra high molecular weight polyethylene (not considered a thermoplastic by some, but included herein nevertheless), polypropylene, polybutene, polymethylpentene, polyisoprene, copolymers thereof, and blends thereof. Exemplary blends include, but are not limited to, blends containing two or more of the following polyethylene, ultra high molecular weight polyethylene, and polypropylene, as well as, blends of the foregoing with copolymers such as ethylene-butene copolymer and ethylene-hexene copolymer and blends of those polymers and co-polymers with differing molecular weights.

Inert, thermal non-deforming particulate filler refers to any material that when uniformly blended into the foregoing thermoplastic polymer does not interact nor chemically react with the thermoplastic polymer to substantially alter its fundamental nature and will not, when used as a component of the membrane of a battery separator, have a material adverse impact upon the chemistry of the battery. This filler may be any material that is thermally stable, i.e., maintains or substantially maintains its physical shape at temperatures above, for example, 200° C. Particulate most often refers to a small bead or grain, but may also describe a flat or planar object or a rod or fiber like object. The filler is small, and by small is meant an average particle size in the submicron (less than 1 micron) range with a maximum particle size no larger than 40% of the membrane layer thickness, alternatively no larger than 10% of the layer's thickness. In some applications (e.g., when making membranes with a thickness of about 1 micron or less), filler with nano-sized average particle sizes is beneficial.

Inert, thermally non-deforming particulate filler may be selected from the following group of materials: carbon based materials, metal oxides and hydroxides, metal carbonates, minerals, synthetic and natural zeolites, cements, silicates, glass particles, sulfur-containing salts, synthetic polymers, and mixtures thereof. Exemplary carbon based materials include: carbon black, coal dust, and graphite. Exemplary metal oxides and hydroxides include those having such materials as silicon, aluminum, calcium, magnesium, barium, titanium, iron, zinc, and tin. Specific examples include: $TiO_2$, MgO, $SiO_2$, $Al_2O_3$, $SiS_2$, and SiPO4. Exemplary metal carbonates include those having such materials as: calcium and magnesium. Specific examples include: $CaCO_3$. Exemplary minerals include: mica, montmorillonite, kaolinite, attapulgite, asbestos, talc, diatomaceous earth, and vermiculite. Exemplary cements include: Portland cement. Exemplary silicates include: precipitated metal silicates (e.g., calcium silicate and aluminum polysilicate), fumed silica, and alumina silica gels. Exemplary sulfur-containing salts include: molybdenum disulfide, zinc sulfide, and barium sulfate. Exemplary synthetic polymers include: polytetrafluoro ethylene (PTFE), polyimide (PI), polyesters (e.g., polyethylene terephtalate (PET)).

The particulate (or filler) may comprise any weight % of the membrane, so long as at the lowest end, there is sufficient particulate to prevent the electrodes from touching and at the upper end there is sufficient thermoplastic to hold the separator together during manufacture of the separator and battery and to hold the separator together between the electrodes. Such a range may be about 1% to about 99% weight of particulate based upon the total weight of the separator. Most often, the range should be between about 1% to about 70% (including all possible subsets of values therebetween).

The foregoing membranes may be made by any conventional process. The two most widely used processes for making microporous membranes for battery separators are know as the dry-stretch (or Celgard) process and the wet (or extraction or TIPS) process. The major difference between these processes is the method by which the microporous structure is formed. In the dry-stretch process, the pore structure is formed by stretching. In the wet process, the pore structure is formed by the extraction of a component. Both processes are similar in that the material components are mixed, typically in an extruder or via master-batching, and then formed into a thin film precursor before pore formation.

The present invention may be manufactured by either process, so long as the inert particulate filler is uniformly mixed into the thermoplastic polymer prior to extrusion of the precursor.

In addition to the above combination of thermoplastic polymer and particulate filler, the mixture may include conventional stabilizers, antioxidants, additives, and processing aids as known to those skilled in the art.

TMA (thermal mechanical analysis) measures the mechanical response of a polymer system as the temperature changes. The compression TMA measures the loss of thickness of a film when a constant force is applied in the Z-direction to the film as a function of increasing temperature. In this test, a mechanical probe is used to apply a controlled force to a constant area of the sample as the temperature is increased. The movement of the probe is measured as a function of temperature. The compression TMA is used to measure the mechanical integrity of the film.

A standard TMA machine (Model No. TMA/SS/150C, Seiko Instruments Inc., Paramus, N.J.) with a probe (quartz cylindrical probe, 3 mm diameter) is used. The load on the probe is 12 5 g. The temperature is increased at the rate of 5° C./min. The film sample size is a single film with the dimensions of 5×5 mm.

Figure 2:
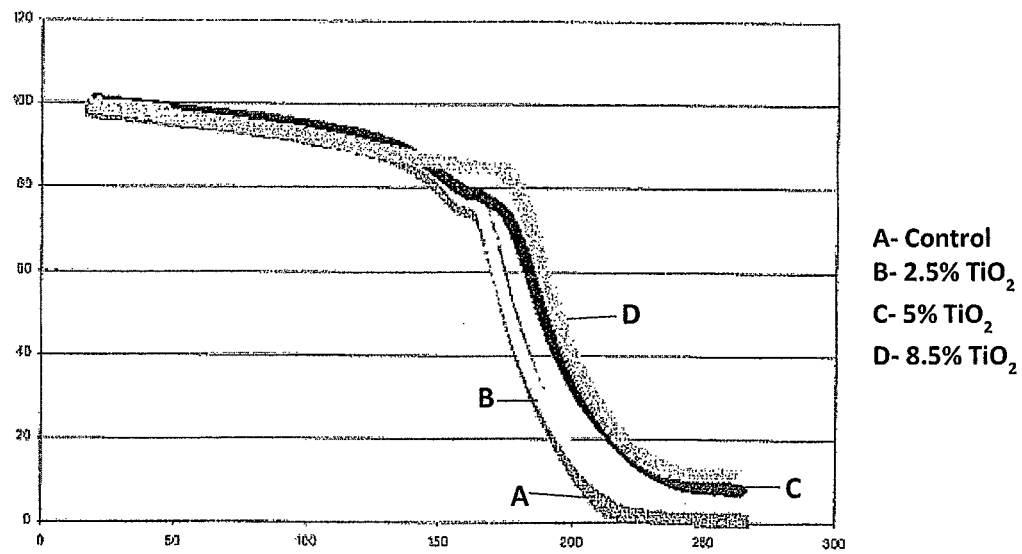
FIG. 2 is a graphical illustration of TMA compression curves for several differing membranes.

In FIGS. 1 and 2, the X-axis represents temperature and the Y-axis represents % TMA. % TMA is percentage reduction in thickness of the membrane as a result of increasing temperature. For example, at 0° C., the membrane's thickness is 100% under the specified load. In the instant membrane, a maximum compression of 95% (or 5% of the original thickness) is suitable to prevent electrode contact.

Referring to FIG. 1, there is shown four (4) TMA compression curves of four different membranes. Each membrane is a microporous membrane of polypropylene. Curve A is the control (i.e., no filler). Curve B has 4% by volume talc. Curve C has 8% talc. Curve D has 12% talc. Note that the control has a maximum compression of 100% at 250° C., whereas Curves C and D never cross the 80% compression lines.

Referring to FIG. 2, there is shown four (4) TMA compression curves of four different membranes. Each membrane is a microporous membrane of polypropylene. Curve A is the control (i.e., no filler). Curve B has 2.5% by volume $TiO_2$. Curve C has 5% $TiO_2$. Curve D has 8.5% $TiO_2$. Note that the control has a maximum compression of 100% at 250° C., whereas Curve B has a maximum compression of about 95% and Curves C and D have a maximum compression of about 90%.

The nail penetration test and the crush test (e.g., ball crush) measure battery response to the catastrophic destruction of a cell. Both tests are internal short circuit tests recommended by Underwriters Laboratory Inc. of Northbrook, Ill. to evaluate the safety of a lithium ion cell. The parameters involved include: cell voltage, nail/ball crush speed, nail size/ball diameter, and operating temperature. The procedure is as follows: 1. charge the Li-ion cell to the required voltage, 2. adjust the required temperature of the chamber in which the test will be done and place the cell over the stand designed for the test, 3. attach two or more thermocouples over the surface of the cell, 4. connect the voltage sensing leads to the positive and negative terminals of the cell, 5. connect the temperature sensing leads to the thermocouples attached to the cell, 6. the entire setup is controlled by a lab view program, 7. choose the appropriate nail (a typical nail will be an inch long, 3-4 mm thick, and having a sharp point) or metal ball (6 mm-12 mm diameter steel ball), 8. once the setup is complete, choose the speed of the test (usual speed ranges from 2-8 mm/sec), 9. the test is started by the lab view control.

Figure 3:
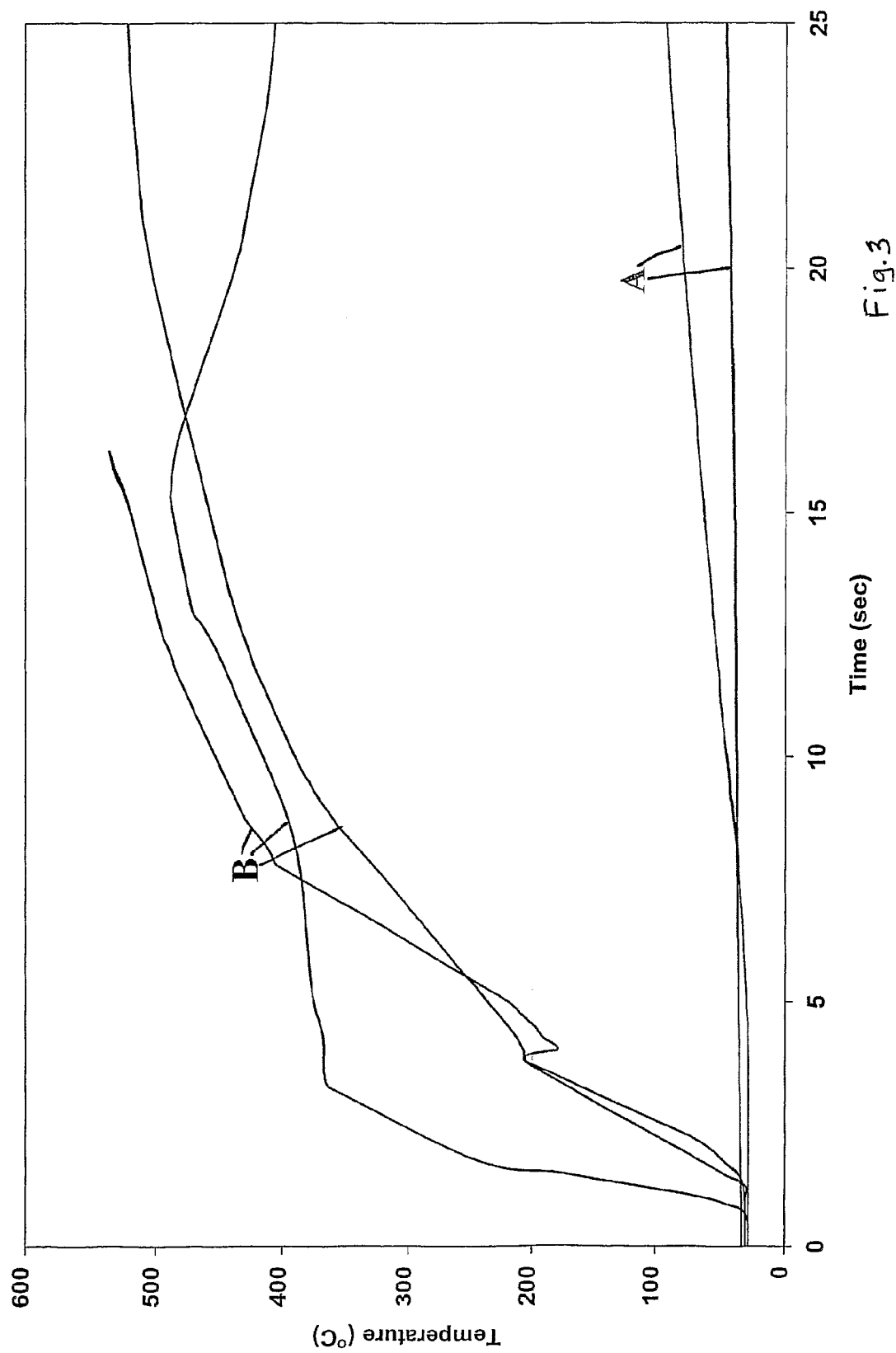
FIG. 3 is a graphical illustration of the external (or housing) temperature (° C.) as a function of time (sec) of an 18650 cell subjected to a nail penetration test.

Referring to FIG. 3, there is shown five (5) curves illustrating temperature (° C.) increase arising from 'nail penetration' as a function of time (sec). Each cell tested was in an 18650 design for a lithium ion cell. The curves labeled A represent the present invention. Specifically, the membrane comprised a microporous membrane of an ultra-high molecular weight polymer (PE) having approximately 53% by weight silica and being made by a wet process. This membrane had an electrical resistance of 1.49 ohm-$cm^2$, a mix penetration strength of 70 kgf (kilogram force), and a dielectric breakdown of 558 V. The curves labeled B represent a prior art separator (unfilled polyolefin). Note the rate of increase in temperature of the conventional (unfilled) separators, while the inventive separator saw little to no temperature increase. The inventive separator's external temperature did not rise above 100° C. from an initial temperature of 25° C. for at least 25 seconds after the nail penetration.

Figure 4:
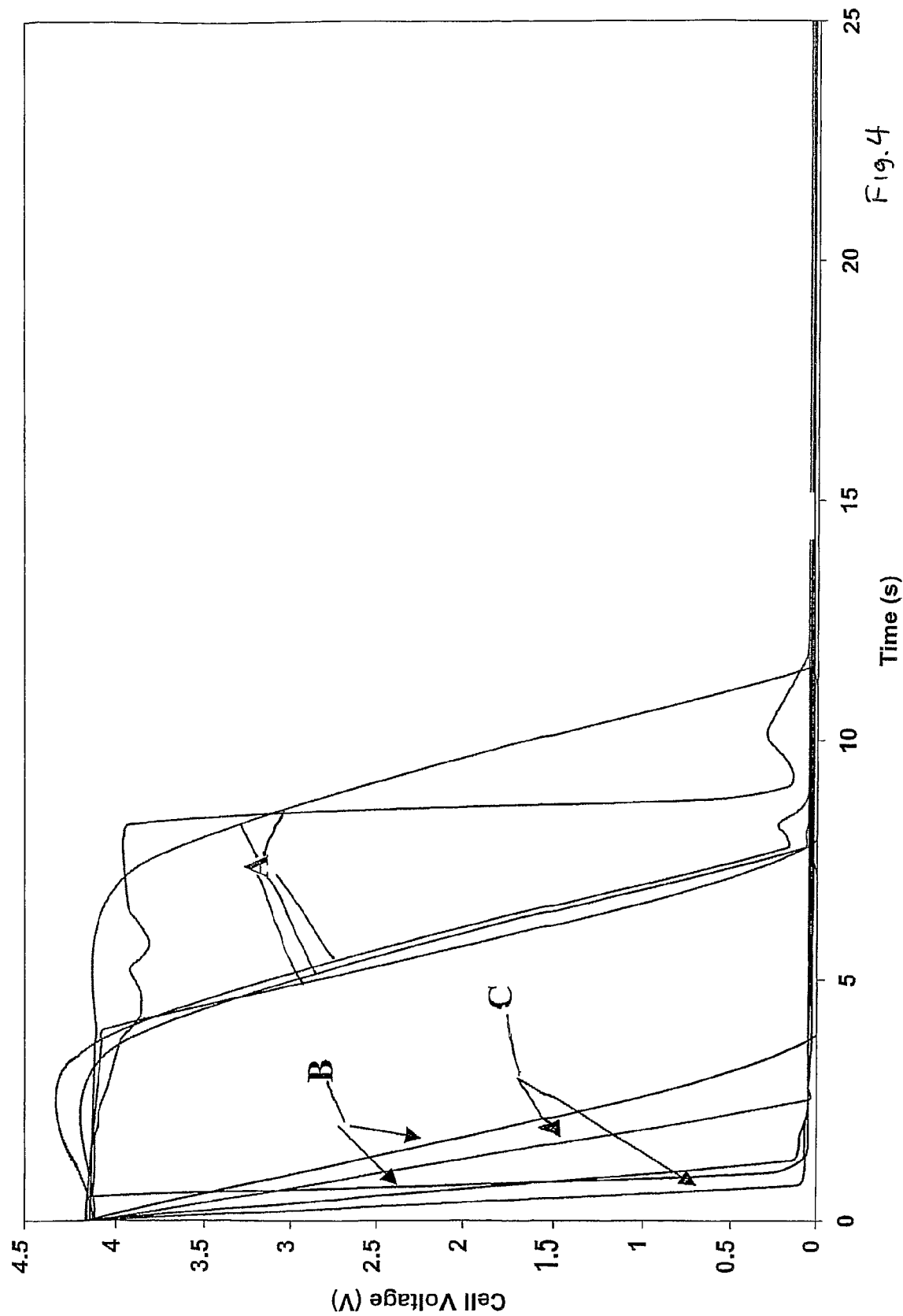
FIG. 4 is a graphical illustration of the cell voltage (V) as a function of time (sec) of a prismatic cell subject to a ball crush test.

Referring to FIG. 4, there is shown several curves illustrating voltage (V) decrease arising from a 'ball crush' test as a function of time (sec). The ball used in the test had a diameter of about 9.4 mm. Each cell tested was in a prismatic design for a lithium ion cell. The curves labeled A represent the present invention. Specifically, the membrane comprised a microporous membrane of an ultra-high molecular weight polymer (PE) having approximately 53% by weight silica and being made by a wet process. This membrane had an electrical resistance of 1.49 ohm-$cm^2$, a mix penetration strength of 70 kgf, and a dielectric breakdown of 558 V. The curves labeled B and C represent prior art separators (unfilled polyolefin). Note that separators A show delayed failure, that all separators A passed the test and none of the other separators (B and C) passed, and that the time for the rise in the external cell temperature (not shown in the Figure) is also higher for separators A than for separators B & C. The inventive separators' voltage remained within 10% of its initial voltage for at least five (5) seconds after being crushed.

A cycling performance test is used to observe the battery operation over its life. The cycling performance test procedure is as follows: 1. charge the cell a C/2 rate to EOCV of 4.2 V, 2. maintain the cell voltage at 4.2 V until the charging current drops to approximately C/50 rate, 3. discharge the cell at a 1C rate to EODV of 3.0 V, 4. rest the cell for 1-2 minutes, 5. steps 1-4 are called one cycle of charge and discharge. Repeat them to get the cycling performance for the desired number of cycles. The following is a definition of the terms: the 'C' rate is a current that is numerically equal to the A-hr rating of the cell (e.g., C/2 rate for a 1 A-hr cell is 500 mA), EOCV is end of charge voltage, and EODV is end of discharge voltage.

Figure 5:
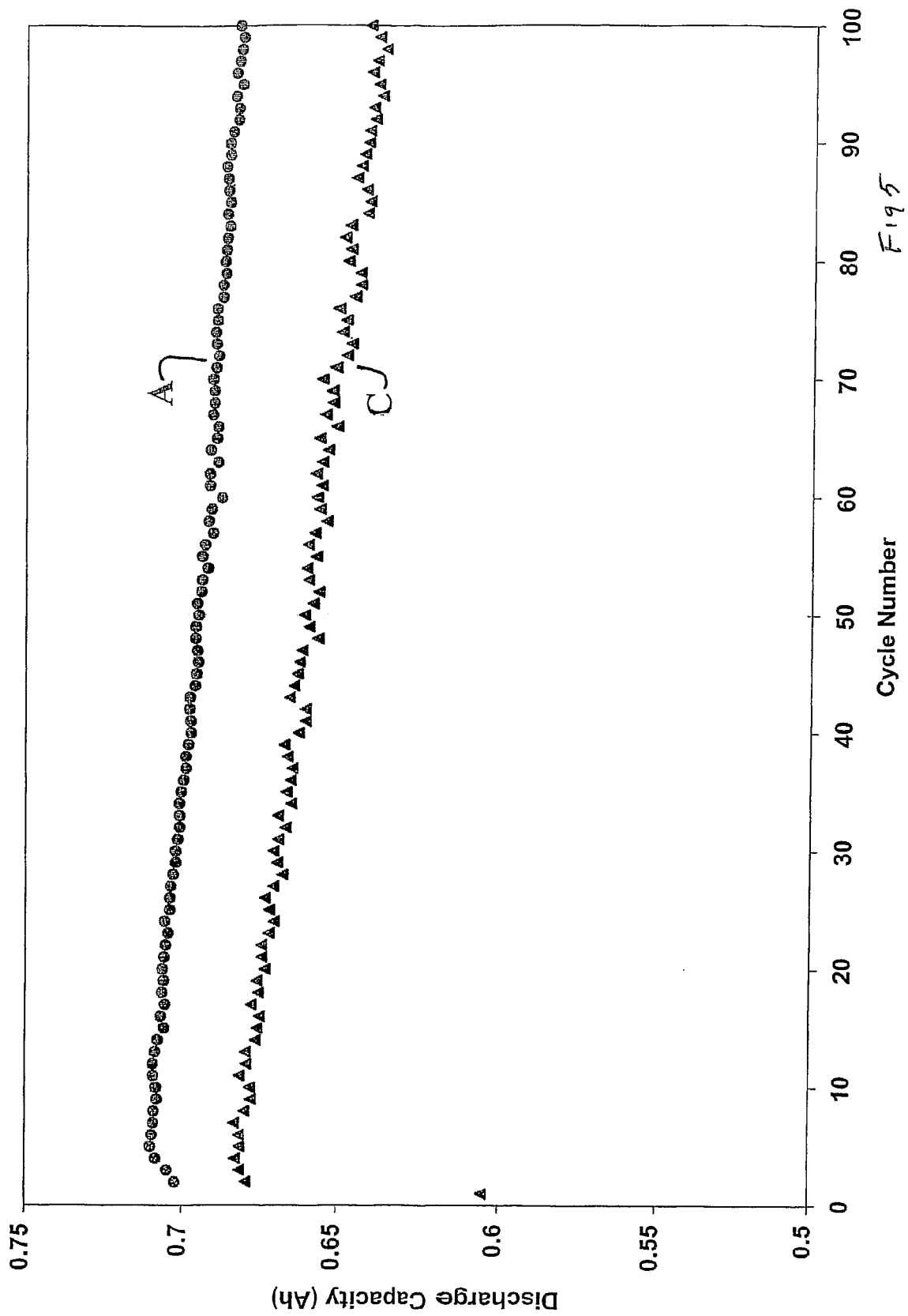
FIG. 5 is a graphical illustration of the cycle performance of a prismatic cell.

Referring to FIG. 5, there is shown two (2) curves illustrating the cycle performance of the instant invention against a prior art separator. In this graph, discharge capacity (Ah) is shown as a function of cycle number. Each cell tested was in a prismatic design for a lithium ion cell. The curve labeled A represents the present invention. Specifically, the membrane comprised a microporous membrane of an ultra-high molecular weight polymer (PE) having approximately 53% by weight silica and being made by a wet process. This membrane had an electrical resistance of 1.49 ohm-cm², a mix penetration strength of 70 kgf, and a dielectric breakdown of 558 V. The curve labeled C represents a prior art separator (unfilled polyolefin). Typically, when the strength of a separator is increase the cycle performance of the separator decreases. In the present invention, however, the cycle performance is improved.

The present invention may be embodied in other forms without departing from the spirit and the essential attributes thereof, and, accordingly, reference should be made to the appended claims, rather than to the foregoing specification, as indicated the scope of the invention.

We claim:

1. A battery separator comprising:
a single layer microporous membrane having a porosity in the range of 20-80% and an original thickness in a range of 4-25 microns, said microporous membrane comprising a thermoplastic polymer and an inert particulate filler having an average particle size of less than 1 micron, said thermoplastic polymer being selected from the group consisting of: polyethylene, polypropylene, polybutene, polymethylpentene, ultra-high molecular weight polyethylene, copolymers thereof, and blends of the foregoing, said filler being dispersed throughout said polymer,
said single layer microporous membrane having a maximum Z-direction compression of 95% of the original single layer microporous membrane thickness at 250° C.

2. The battery separator of claim 1 wherein said inert particulate filler being selected from the group consisting of: carbon based materials, metal oxides and hydroxides, metal carbonates, minerals, synthetic and natural zeolites, cements, silicates, glass particles, sulfur-containing salts, synthetic polymers, and mixtures thereof.

3. The battery separator of claim 1 wherein the particulate comprises 1 to 99% by weight of said single layer microporous membrane.

4. The battery separator of claim 1 wherein said single layer microporous membrane has a maximum Z-direction compression of 85% of the original single layer microporous membrane thickness at 250° C.

5. The battery separator of claim 1 wherein said single layer microporous membrane has a TMA compression curve with a first substantially horizontal slope between ambient temperature and 125° C., a second substantially horizontal slope at greater than 225° C., wherein a Y-axis represents % compression from original thickness and a X-axis represents temperature, said curve of said first slope having a lower % compression than said curve of said second slope, and said curve of said second slope not being less than 5% compression.

6. The battery separator of claim 1 wherein the particulate comprises 1 to 70% by weight of said single layer microporous membrane.

7. A lithium-ion battery comprising the separator of claim 1.

* * * * *